United States Patent [19]

Koshoffer

[11] Patent Number: 5,117,628
[45] Date of Patent: Jun. 2, 1992

[54] MIXED FLOW AUGMENTOR PRE-MIXER

[75] Inventor: John M. Koshoffer, Green Hills, Ohio

[73] Assignee: General Electric Company, Cincinnati, Ohio

[21] Appl. No.: 469,982

[22] Filed: Jan. 25, 1990

[51] Int. Cl.⁵ .............................................. F02K 3/10
[52] U.S. Cl. ..................................... 60/226.1; 60/261; 60/262
[58] Field of Search .................. 60/261, 262, 226.1; 239/392, 127.1, 127.3

[56] References Cited

U.S. PATENT DOCUMENTS

| | | | |
|---|---|---|---|
| 2,999,672 | 9/1961 | Harshman | 259/4 |
| 3,100,627 | 8/1963 | Wilde | 259/4 |
| 3,465,525 | 9/1969 | Cowley et al. | 60/261 |
| 3,595,024 | 7/1971 | Kohler et al. | 60/39.72 |
| 3,747,345 | 7/1973 | Markowski | 60/261 |
| 3,750,402 | 8/1973 | Vdoviak et al. | 60/261 |
| 3,974,646 | 8/1976 | Markowski et al. | 60/39.65 |
| 4,134,260 | 1/1979 | Lefebvre et al. | 60/261 |
| 4,335,573 | 6/1982 | Wright | 60/262 |
| 4,461,146 | 7/1984 | DuBell | 60/261 |
| 4,487,017 | 12/1984 | Rodgers | 60/262 |

FOREIGN PATENT DOCUMENTS

| | | |
|---|---|---|
| 874512 | 8/1961 | United Kingdom . |
| 1157150 | 7/1969 | United Kingdom . |
| 1540355 | 2/1979 | United Kingdom . |
| 2062765 | 5/1981 | United Kingdom . |
| 2082259 | 3/1982 | United Kingdom . |
| 2139288 | 11/1984 | United Kingdom . |

Primary Examiner—Richard A. Bertsch
Assistant Examiner—David L. Cavanaugh
Attorney, Agent, or Firm—Jerome C. Squillaro; David L. Narciso

[57] ABSTRACT

A mixer arrangement for a bypass type gas turbine engine is disclosed. The mixer is convoluted and generally annular and defines radially and axially extending first and second chutes adapted to receive, respectively, a hot gas stream from the engine core and a cooler gas stream from the fan duct. A pre-mixer is disposed upstream of the mixer and is also convoluted and is aligned in flow communication with the second chutes of the mixer such that the hot gas stream received by the pre-mixer is mixed with the cooler fan air stream received by the second chutes to raise the temperature of the fan air entering an afterburner section of the engine.

18 Claims, 6 Drawing Sheets

MIXED FLOW AUGMENTOR PRE-MIXER

The invention herein described was made in the course of or under a contract, or a subcontract thereunder, with the U.S. Department of the Air Force.

BACKGROUND OF THE INVENTION

1. Field of the Invention

The present invention relates to bypass type gas turbine engines, and more particularly, to a mixer arrangement for mixing the hot gas stream from the engine core with fan air from the bypass duct to thereby increase the temperature of the fan air prior to entering an afterburner section of the engine.

2. Description of the Related Art

In bypass type gas turbine engines, a portion of the air entering the turbine enters the core engine while the remaining portion of the air passes through a substantially annular duct surrounding the core engine. A low pressure fan is typically disposed upstream of the compressor of the core engine to pressurize the fan air entering the duct. Prior to entering a nozzle disposed aft of the core engine, a portion of the hot gas stream exhausting through the core is mixed with the fan air passing through the fan duct. During thrust augmentation or afterburning, liquid fuel is injected through spray bars where it is ignited with a mixture of the hot gas exhausting through the core and the fan air exhausting through the fan duct. This thrust augmentation, or afterburning, usually occurs in an afterburner section disposed immediately upstream of the nozzle and increases the energy of the exhaust stream to thereby increase the thrust of the nozzle.

A typical example of a mixer for mixing engine generated hot gases with fan air prior to discharge of the mixed gases through the engine nozzle is illustrated in U.S. Pat. No. 4,335,573. The mixer described therein is comprised of a plurality of alternating first and second chutes disposed around the core engine near the nozzle entrance. Each of the first and second chutes include an upstream portion and a downstream portion with the upstream portion being rotatably journaled on a bearing such that the first or second chutes may be rotated to achieve flow communication between the upstream and downstream portions of the first and second chutes. This rotation or indexing effects a temperature reduction of the flameholding elements in the downstream portions thereby minimizing infrared emissions from the engine nozzle. This reduction in infrared emissions aids in avoiding acquisition and tracking by heat seeking hostile missiles and permits countermeasures or evasive action to be taken against such missiles.

To the inventor's knowledge, all prior art mixer configurations, including that described in the above-referenced patent, exhibit a problem of blowout or resonance in the upper left-hand corner of the flight map where fan exit temperatures and afterburner pressures are low. In that portion of the flight map, afterburner operation is unavailable due to the possibility of blowout of the engine or damaging resonance vibration.

FIG. 1 illustrates a graph of a typical flight map wherein the abscissa corresponds to the mach number of the aircraft, and the ordinate corresponds to the pressure altitude in thousands of feet. In the graph of FIG. 1 the region of unstable combustion or blowout is depicted by cross-hatching in the area marked 200. In the past, marginally successful attempts have been made to alleviate the problem of blowout or resonance in portion 200 of the flight map of FIG. 1 by limiting the augmentation ratio of the engine. Additionally, some fuel distribution work in the afterburner section has shown some influence.

SUMMARY OF THE INVENTION

Stabilization of burn in an afterburner requires that the flame be anchored and stabilized on a flame holder. The previously mentioned problems of blowout and resonance which tend to occur in the region 200 of the flight map of FIG. 1 are characterized by gyrations or movement of the flame in the afterburner section, i.e. the flame resulting from ignition of the fan air with injected fuel does not remain anchored on the flame holder.

Stable burn in an afterburner is effected by the pressure of the fan air and the temperature of the fan air. The velocity of the fan air may also effect stable combustion in the afterburner. However, the inventor herein has determined empirically that velocity does not have a significant correlation with stability of combustion. Further, since in the portion 200 of the flight map of FIG. 1 the pressure is fixed by altitude and bypass fan pressure ratio, the inventor herein focused on controlling the fan air temperature as a means of stabilizing burn in the afterburner and arrived at the novel structure disclosed.

Thus, it is an object of the present invention to provide a mixer arrangement for a bypass type gas turbine engine which provides enhanced rich stability limits during thrust augmentation or afterburner operation such that afterburner operation is available over a greater portion of the engine flight map.

It is a further object of the present invention to provide a mixer arrangement for a bypass type turbine engine which raises the temperature of the fan air prior to entering the afterburner section of the engine.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects, and in accordance with the purposes of the invention as embodied and broadly described herein, a mixer arrangement for use in a bypass type gas turbine engine is provided which comprises: a convoluted, generally annular mixer defining an array of radially and axially elongated, alternating first and second chutes. Each of the first and second chutes has an upstream inlet and downstream outlet with the inlets of the first and second chutes adapted to receive, respectively, an inner hot gas stream from the core of the engine and an outer stream of fan air from the bypass duct of the engine. The arrangement further includes means for directing hot core gases into the second chutes of the mixer upstream of the outlet of the second chutes to raise the temperature of the fan air prior to entering the afterburner.

Preferably the directing means comprises a convoluted, generally annular pre-mixer defining an array of radially and axially elongated, alternating third chutes, with each of the third chutes having an outlet spaced a predetermined distance upstream of the outlets of the second chutes. The third chutes are adapted to receive an inner hot gas stream from the core of the engine. The pre-mixer and mixer are disposed in the engine such that the third chutes defined by the pre-mixer are in axial flow communication with the second chutes defined by the mixer. In this manner, the hot gases received by the third chutes emerge from the outlet of the third chutes to mix with the fan air passing through the second chutes of the mixer. Thus, the structure of the preferred embodiment of the present invention effectively mixes hot exhaust gases with the fan air to increase the temperature of the fan air prior to the fan air reaching the afterburner.

Preferably, a flame holder means is disposed substantially adjacent the terminus of the mixer for stabilizing the combustion of the fuel and air in the afterburner section of the engine during thrust augmentation. Thus, the fan air entering the afterburner section is increased in temperature prior to reaching the flame holder means.

It is further preferable that core spray bars be disposed within the sidewalls defining the third chutes of the pre-mixer. In this manner, fuel injected through the core spray bars is vaporized or "carbureted" in the hot gas stream from the core prior to mixing with the cooler fan air.

BRIEF DESCRIPTION OF THE DRAWINGS

In the accompanying drawings, which are incorporated in and constitute a part of the specification, illustrate preferred embodiments of the invention and, together with the general description given above and a detailed description of the preferred embodiments given below, serve to explain the principles of the invention.

DESCRIPTION OF THE PREFERRED EMBODIMENT

Figure 2:
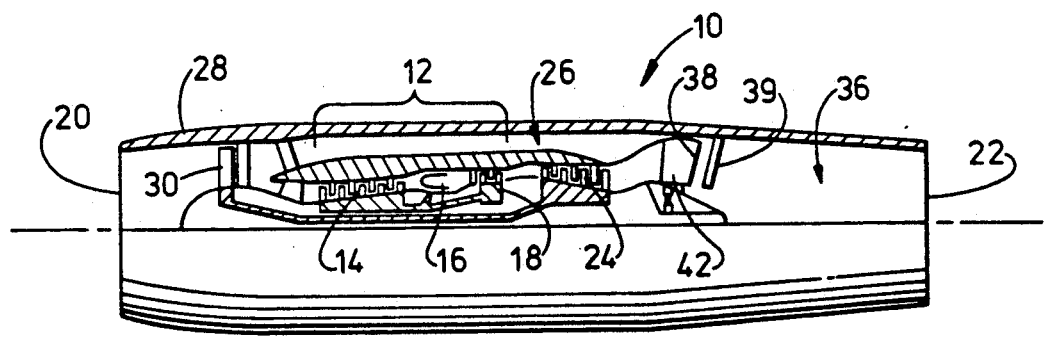
FIG. 2 is a schematic representation of the major components of a bypass type gas turbine engine.

Reference will now be made in detail to the present preferred embodiments of the invention as illustrated in the accompanying drawings. FIG. 2 illustrates the major components of a bypass type gas turbine engine, generally referred to as 10. Engine 10 includes a core 12 having a compressor 14, a combustor 16, and a high pressure turbine 18 aligned in series flow relationship to generate a hot gas stream which exhausts through engine 10 from the upstream end 20 to the downstream end 22. A low pressure turbine 24 is disposed downstream of high pressure turbine 18. A substantially annular duct 26 surrounds core 12 and low pressure turbine 24 and is defined at its outer boundary by engine casing 28. A bypass fan 30 is disposed upstream of compressor 14 and is operatively connected to low pressure turbine 24 for pressurizing and passing a stream of fan air through duct 26.

In operation, air entering upstream end 20 of engine 10 is pressurized by fan 30. A portion of the pressurized air enters core engine 12 through compressor 14 and emerges from low pressure turbine 24. The remaining portion of the fan air flows through duct 26 around core 12 and low pressure turbine 24. A mixer 42 is disposed downstream of low pressure turbine 24 for mixing the fan air and core gases prior to entering an afterburner section 36. Typically, flame holder means comprised of a plurality of V-shaped annular gutters 39 are disposed adjacent the outlet or downstream end 38 of mixer 42.

During thrust augmentation or afterburning, fuel is injected through spray bars into the core exhaust stream, and in some instances into the fan exhaust stream, upstream of the flame holders where it is ignited by conventional means well known in the art. The injected fuel is combusted with a mixture of exhaust gases exiting core 12 and fan air exiting duct 26 in afterburner section 38 prior to exiting through an exhaust nozzle. It is the configuration of mixer 42 to which the present invention is directed.

Figure 4:
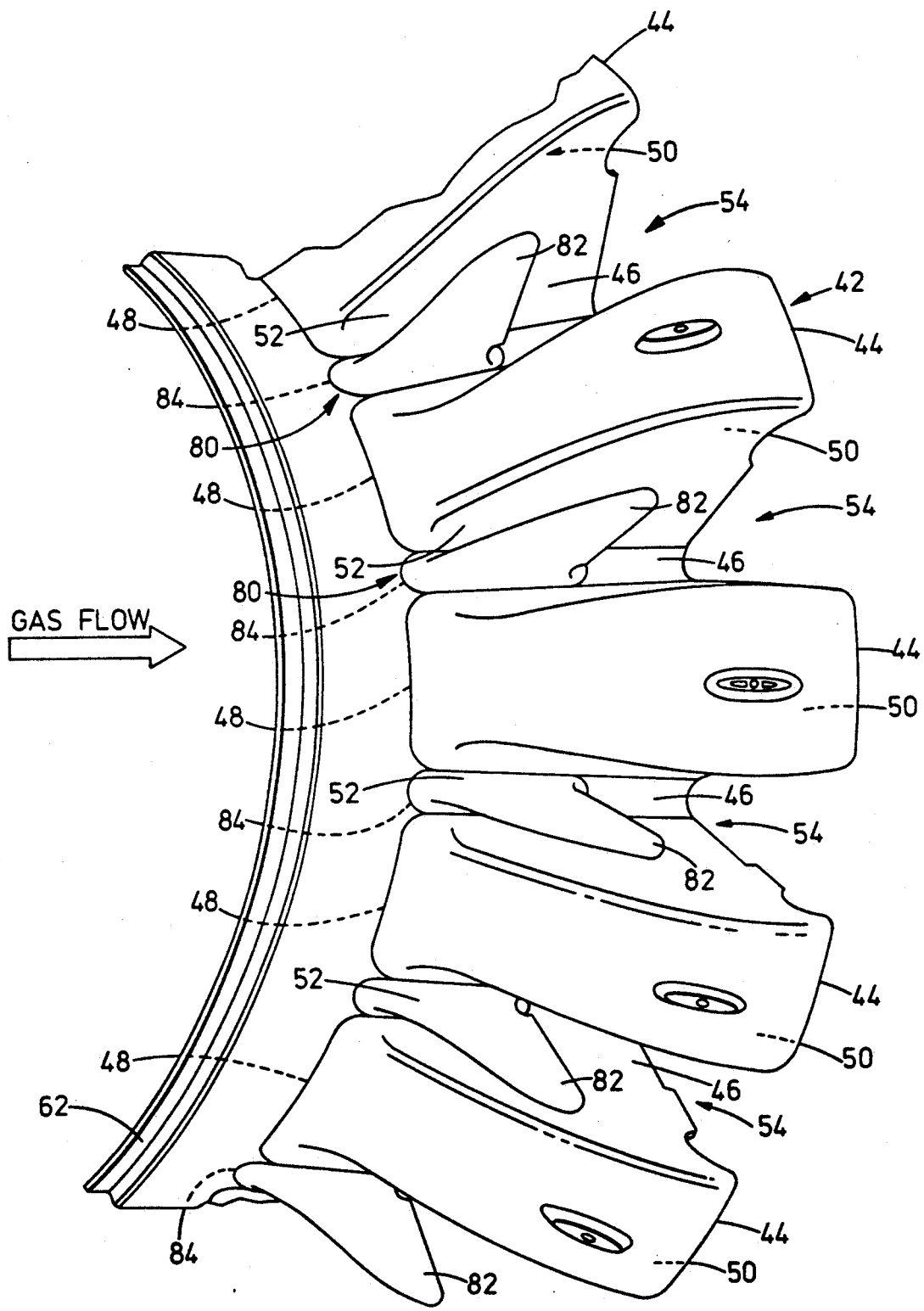
FIG. 4 is a partial isometric view, looking downstream, of a mixer and pre-mixer arrangement incorporating the teachings of the present invention.
Figure 5:
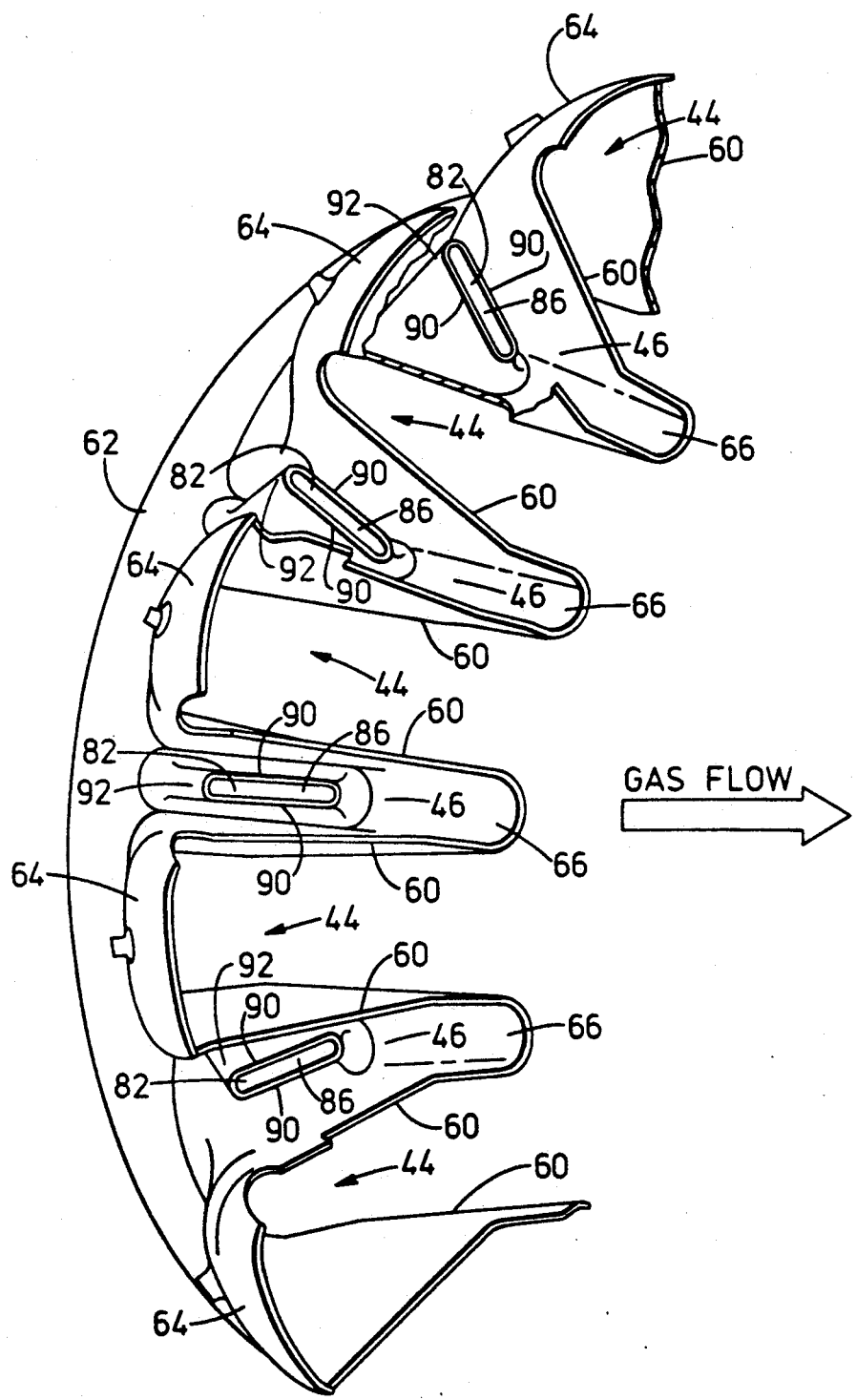
FIG. 5 is a partial isometric view, looking upstream, of the mixer and pre-mixer arrangement of FIG. 4.

With reference to FIGS. 4 and 5, there is shown a downstream view and an upstream view, respectively, of a mixer arrangement incorporating the teachings of a first embodiment of the present invention. The mixer arrangement includes a convoluted, generally annular mixer 42 defining an array of radially and axially elongated, alternating first and second chutes 44 and 46, respectively. The direction of gas flow through mixer 42 is indicated by the labeled arrow in FIGS. 4 and 5. Each of the first chutes 44 includes an upstream inlet 48 and a downstream outlet 50. Similarly, each of second chutes 46 includes an upstream inlet 52 and a downstream outlet 54.

With specific reference to FIG. 5, first and second chutes 44 and 46 are defined by a plurality of sidewalls 60 which extend radially and axially from a flange 62. Flange 62 is mechanically attached to appropriate support structure to fix and position mixer 42 within the engine. The specific support structure and manner in which mixer 42 is attached to the support structure forms no part of the present invention. Any typical structural support configuration known to those skilled in the art may be used.

Each sidewall 60 is connected to one adjacent sidewall by a top wall 64 to define first chutes 44. Each sidewall 60 is also connected to its other adjacent sidewall by a bottom wall 66 to define second chutes 46. While bottom walls 66 are generally flat and extend radially, top walls 64 are sloped and smoothly transition into the respective sidewalls 60 to form the convoluted, axially and radially extending configuration of the first and second chutes.

Figure 3:
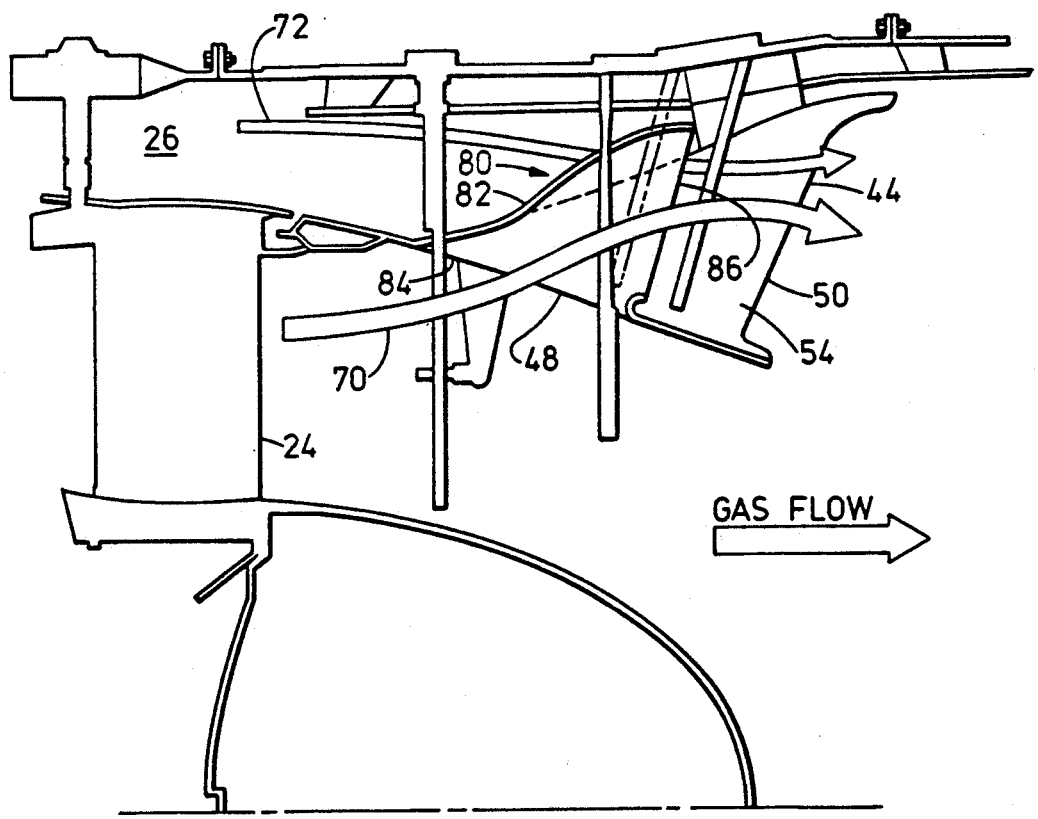
FIG. 3 is a partial cross-sectional view of a gas turbine engine incorporating the pre-mixer and mixer arrangement of the present invention.
Figure 9:
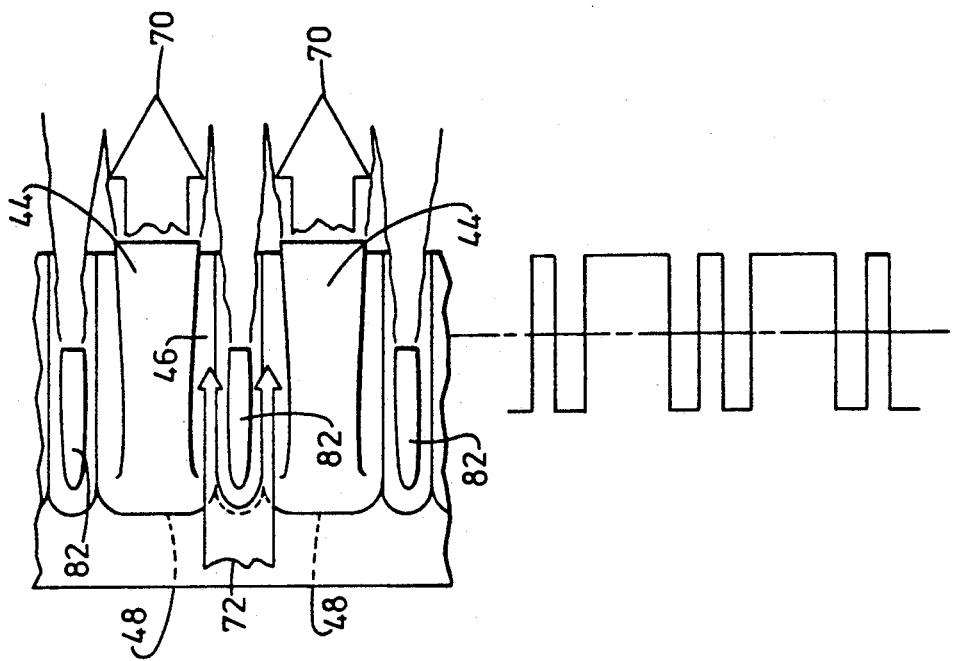
FIG. 9 is a top view of the mixer and pre-mixer arrangement of the present invention illustrating the flow paths of the hot core gases and fan air through the first, second and third chutes.

First chutes 44 of mixer 42 are adapted to receive, as a result of their convoluted configuration, an inner hot gas stream from core 12 of engine 10. This may best be seen in FIGS. 3 and 9. FIG. 3 is a partial side view of the engine 10 incorporating the mixer arrangement of the present invention, and FIG. 9 is a partial top view of mixer 42.

Core gases emerging from low pressure turbine 24 flow through inlets 48 of first chute 44, and emerge through outlets 50 of the first chutes. This hot gas flow path is illustrated by arrow 70 in FIG. 3. Simultaneously, colder fan air passing through bypass duct 26 enters inlets 52 of second chutes 46 and emerges from outlets 54 of the second chutes to mix with the hot core gases emerging from first chutes 44. The flow path of the cold fan air from bypass duct 26 through second chutes 46 is illustrated by arrow 72. Bear in mind that until emerging from the respective outlets of the first and second chutes, the hot core gases and cold fan air are separated by sidewalls 60, top walls 64 and bottom walls 66 of mixer 42. Moreover, the hot core gases and cold fan air do not completely mix until reaching a finite distance downstream of the outlets 50 and 54.

The mixer arrangement of the present invention further includes means for directing hot core gases into the second chutes of the mixer upstream of the outlets of the second chutes to raise the temperature of fan air in the second chutes. As embodied herein and in accordance with a first preferred embodiment of the invention, the directing means comprises a convoluted, generally annular pre-mixer 80 defining an array of radially and axially elongated, alternating third chutes 82 as illustrated in FIGS. 3, 4, and 5. Third chutes 82 each have an upstream inlet 84 and a downstream outlet 86. Inlets 84 are adapted to receive an inner hot gas stream from core 12 of engine 10. Outlets 86 are spaced upstream from and in flow communication with outlets 54 of second chutes 46. In this manner, the hot core gases emerging from outlets 86 of third chutes 82 are mixed with the cold fan air passing through second chutes 46 to raise the temperature of the fan air prior to emerging from outlets 54 into the afterburner.

Similarly, as described above with respect to the first chutes, the third chutes are defined by sidewalls 90, shown in FIG. 5, which are connected by a top wall 92 which blends smoothly into sidewalls 90. Top walls 92 are sloped to form the convoluted configuration of pre-mixer 80.

Figure 6:
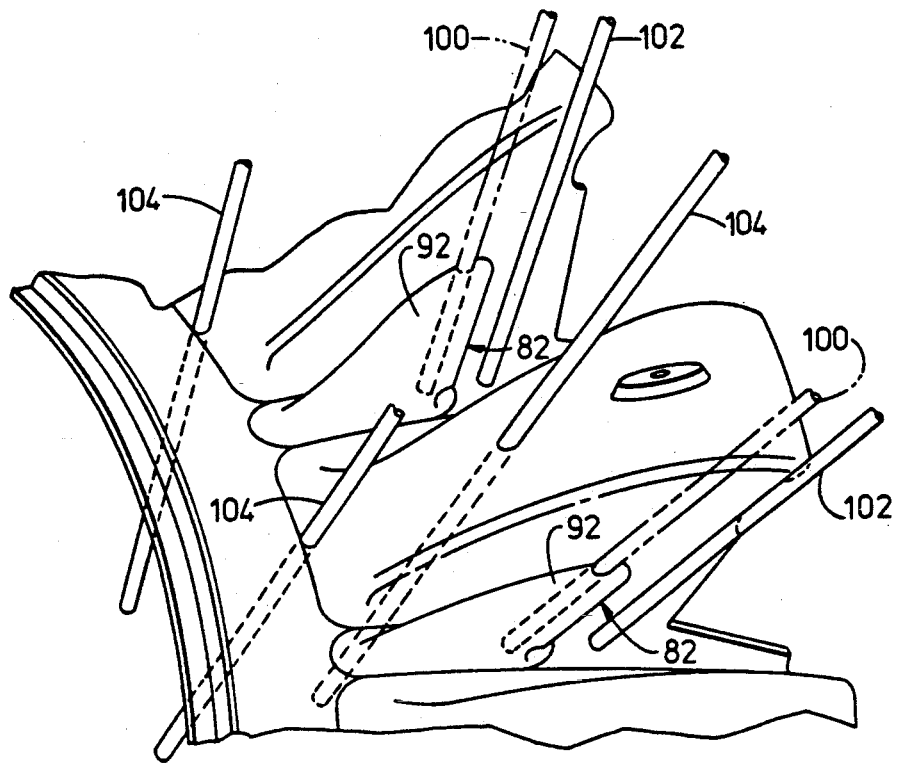
FIG. 6 is a partial isometric view, looking downstream, of a mixer and pre-mixer arrangement of the present invention illustrating the placement of fuel spray bars relative to the first, second, and third chutes.
Figure 7:
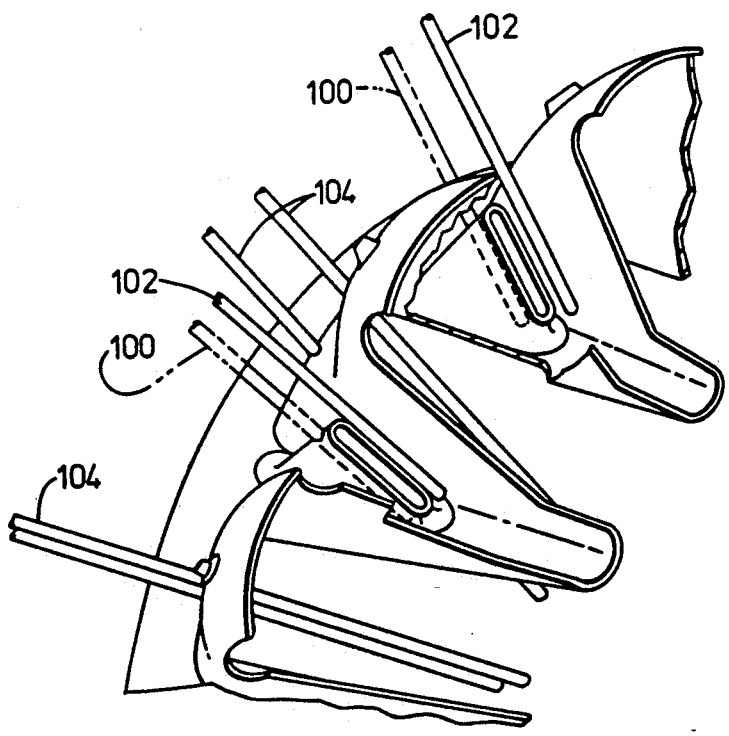
FIG. 7 is a partial isometric view, looking upstream, of the fuel spray bar configuration of FIG. 6.

Fuel for afterburning combustion is injected into the exhaust gas stream through spray bars which extend radially inwardly from outer casing 28, or from intermediate structure attached to outer casing 28. This fuel is injected into the engine at various positions to "stage" the afterburn. Afterburn staging itself is not a new concept, and its meaning will be understood by those skilled in the art. The configuration of the present invention provides an advantageous manner in which the effects of afterburn staging may be improved. Specifically, and with reference to FIGS. 6 and 7, a plurality of first spray bars 100 are disposed to extend radially inwardly into engine 10, through top walls 92 of third chutes 82, and terminate within the third chutes. Spray bars 100 are disposed circumferentially around outer casing 26 and are spaced apart from one another by a predetermined distance corresponding to the spacing of third chutes 82. Fuel is injected through first spray bars 100 into the hot core gases passing through third chutes 82. In this manner, the fuel from spray bars 100 is vaporized and mixed with the hot core gases passing through third chutes 82 prior to mixing with the cold fan air in second chutes 46. This enhances the vaporization and carburets the fuel with the hot core gases.

A second plurality of spray bars 102 may be provided which terminate downstream of the outlets 86 of third chutes 82. Fuel injected through these spray bars 102 is mixed with the cold fan air passing through second chutes 46 and the hot core gases emerging from third chutes 82.

Additional spray bars 104 may also be provided to inject fuel into the hot core gas passing through first chutes 44 and through the bypass fan duct as is conventional in bypass engines.

Due to the direct addition of fuel to the hot core gas stream at the exit of third chutes 82, the stoichiometric ratio of the mixture of hot core gas and cooler fan air may be closely controlled to enhance the rich stability limits during afterburn. In fact, depending on the desired rich stability limits, it may be possible to eliminate certain ones or all of fan spray bars 104 and add fuel for afterburning only through core spray bars 100 and 102.

Figure 1:
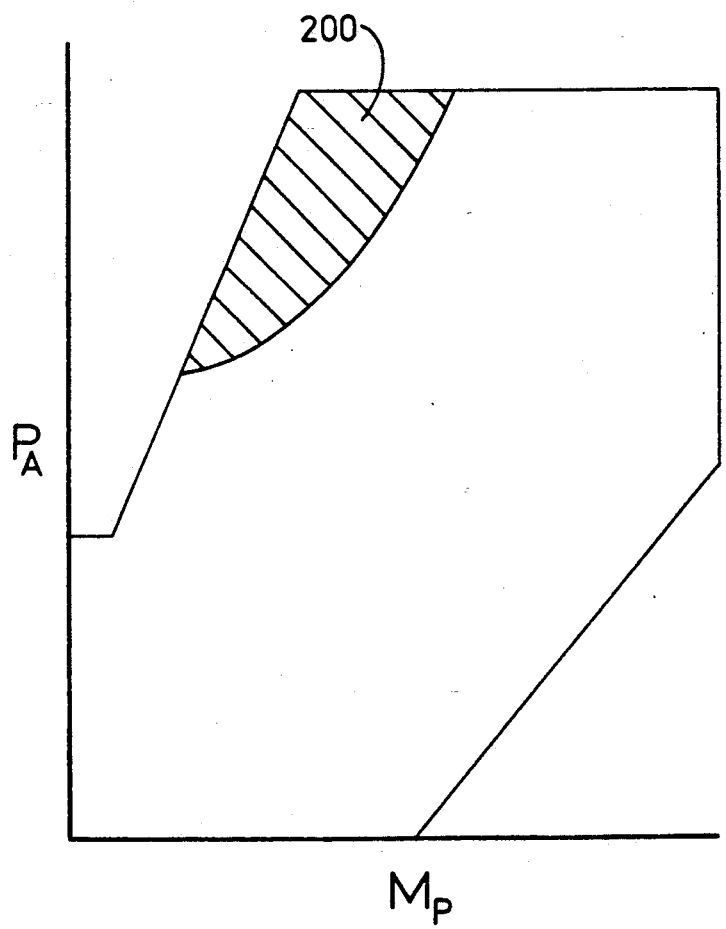
FIG. 1 is a graphical illustration of a typical flight map for a bypass type gas turbine engine which correlates the flight mach number to the pressure.

As described previously, the inventor herein determined that an important parameter which influences the reheat capability in the rich stability portion of the flight map is the fan air temperature. The configuration of the mixer and pre-mixer arrangement of the first embodiment of the present invention illustrated in FIGS. 3, 4, 5, 6, 7, and 9 provides hot exhaust gases from core 12 through third chutes 82 of pre-mixer 80. These hot core exhaust gases are mixed with fan air in second chutes 46 of mixer 42 to effectively raise the fan air temperature prior to emerging from the second chutes and reaching the afterburner. Increasing the temperature of the fan air in this manner effectively moves the rich stability region of the jet engine off the flight map, thus minimizing chances of blowout or unstable combustion in the region 200 illustrated in FIG. 1.

Figure 8:
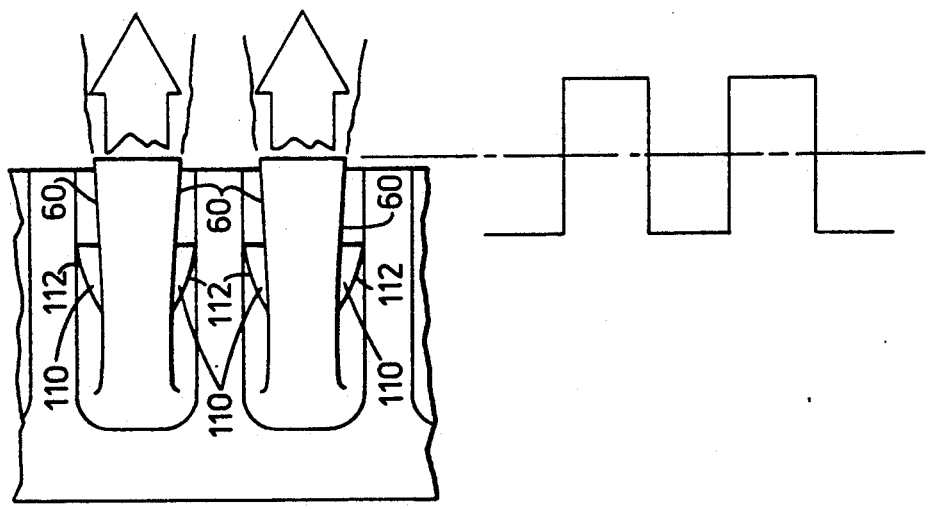
FIG. 8 is a partial top view of a second embodiment of the present invention wherein conduits are formed in the sidewalls of the first and second mixer chutes to mix hot core gases with the fan air.

With reference to FIG. 8, there is illustrated a second embodiment of a mixer arrangement for a bypass gas turbine engine incorporating the teachings of the present invention.

The directing means, comprised of pre-mixer 80 defining third chutes 82 in the first embodiment described above, in this second embodiment comprises conduit means, formed in sidewalls 60 of Mixer 42. As embodied herein, the conduit means comprises conduits 110 which pass a portion of the hot gas stream entering first chutes 44 from core 12 into respective ones of second chutes 46 to thereby increase the temperature of the fan air stream passing through second chutes 46. Conduits 110 are defined by a streamlined conduit wall 112 integrally formed with and extending outwardly from and longitudinally along sidewall 60. In this manner, turbulence at sidewalls 66 is minimized due to the streamlined surface of conduit wall 112. Moreover, since the amount of hot core gases passing from chutes 44 into second chutes 46 through conduits 110 is a function of the geometry of apertures 82, that geometry may be selected to pass a predetermined volume of hot exhaust gases from first chutes 44 into second chutes 46 to thereby raise the temperature of the fan air by a predetermined amount in accordance with the volumetric flows of the fan air through chutes 46 and the hot exhaust gases through conduits 110. Obviously, any number of apertures 82 may be individually formed in sidewalls 60 to carry hot exhaust gases from first chutes 44 into second chutes 46.

Additional advantages and modifications will readily occur of those skilled in the art. The invention in its broader aspect is, therefore, not limited to the specific details, representative apparatus, and illustrative example shown and described. Accordingly, departures may be made from such details without departing from the spirit or scope of Applicant's general inventive scope.

What is claimed is:

1. A mixer arrangement for use in a bypass gas turbine engine including a fan, a core, a bypass duct, and an afterburner, said mixer arrangement comprising:

a convoluted, generally annular mixer defining an array of radially and axially elongated, side by side alternating first and second chutes, each of said first and second chutes having a downstream outlet and an upstream inlet, said inlets of said first chutes being adapted to receive an inner hot gas stream from the core of the engine and said inlets of said second chutes being adapted to receive an outer stream of fan air from the bypass duct of the engine; and means disposed in said second chutes and interposed in side by side relation between adjacent pairs of said first chutes for directing hot core gases into said second chutes upstream of said outlets of said second chutes to mix hot core gases with cooler fan air and raise the temperature of the fan air in said second chutes, whereby rich stability limits are raised for improved afterburner operation.

2. The mixer arrangement of claim 1, wherein said directing means comprises a convoluted, generally annular pre-mixer defining an array of radially and axially elongated third chutes, each of said third chutes having an outlet spaced a predetermined distance upstream from said outlets of said second chutes, and an inlet adapted to receive an inner hot gas stream from the core of the engine.

3. The mixer arrangement of claim 2, wherein said third chutes are disposed in axial flow communication with respective ones of said second chutes such that said hot gas stream passing through said third chutes emerges from said outlets of said third chutes to mix with said stream of fan air passing through said second chutes to thereby increase the temperature of the fan air prior to reaching said outlets of said second chutes.

4. The mixer arrangement of claim 2, wherein said third chutes are defined by a plurality of sidewalls, each pair of said sidewalls being connected by a top wall which slopes radially to form the convoluted configuration of said pre-mixer.

5. The mixer arrangement of claim 1, wherein said first chutes are defined by a plurality of sidewalls, each said sidewall being connected to one adjacent sidewall by a top wall to form the first chutes of said array, and being connected to the other adjacent sidewall by a bottom wall to form the second chutes of the array.

6. The mixer arrangement of claim 2, wherein the engine includes an outer casing and a plurality of first spray bars extending radially inwardly from said outer casing and terminating within each said third chute.

7. The mixer arrangement of claim 6, including a plurality of second spray bars extending radially inwardly from said outer casing and being spaced downstream from said first spray bars and proximate the outlets of said third chutes.

8. The mixer arrangement of claim 1, including flame holder means, disposed substantially adjacent said terminus of said mixer, for stabilizing the combustion of fuel and air in an afterburner section of the engine during thrust augmentation.

9. A mixer arrangement for a bypass gas turbine engine comprising:

a convoluted, generally annular mixer having a plurality of sidewalls joined by alternating top and bottom walls to define an array of radially and axially elongated, alternating first and second chutes, each of said first and second chutes having a downstream outlet and an upstream inlet, said inlets of said first and second chutes adapted to receive, respectively, an inner hot gas stream from the core of the engine and an outer stream of fan air from the bypass duct of the engine; and conduit means, formed in said sidewalls of said mixer, for passing a portion of said hot gas stream from said first chutes into said second chutes to thereby selectively increase the temperature of said fan air passing through said second chutes.

10. The mixer arrangement of claim 9, wherein said conduit means includes at least one aperture formed in each said sidewall.

11. The mixer arrangement of claim 10, wherein each said aperture is defined by a streamlined conduit wall integrally formed with and extending outwardly from and axially along said sidewall.

12. The mixer arrangement of claim 9, including flame holder means, disposed substantially adjacent said terminus of said mixer, for stabilizing the combustion of fuel and air in an afterburner section of the engine during thrust augmentation.

13. A bypass gas turbine engine, comprising:

a core engine including a compressor, a combustor, and high pressure turbine arranged in series flow relationship to generate a hot gas stream;

a low pressure turbine disposed downstream of said high pressure turbine;

a core engine casing and an outer casing spaced from said core engine casing to define an annular duct;

a fan, disposed upstream of said compressor and operably connected to said low pressure turbine, for pressurizing a stream of fan air in said duct;

means for mixing a portion of said hot gas stream with said stream of fan air upstream of an afterburner;

nozzle means, disposed downstream of said mixing means and said afterburner, to provide propulsive thrust for the engine;

said mixing means including:

a convoluted, generally annular mixer defining an array of radially and axially elongated, side by side alternating first and second chutes, each of said first and second chutes having a downstream outlet and an upstream inlet, said inlets of said first chutes being adapted to receive an inner hot gas stream from the core of the engine and said inlets of said second chutes being adapted to receive an outer stream of fan air from the bypass duct of the engine; and means disposed in said second chutes and interposed in side by side relation between adjacent pairs of said first chutes for directing hot core gases into said second chutes upstream of said outlets of said second chutes to mix hot core gases with cooler fan air and raise the temperature of the fan air in said second chutes, whereby rich stability limits are raised for improved afterburner operation.

14. The engine of claim 13, wherein said directing means comprises:

a convoluted, generally annular pre-mixer defining an array of radially and axially elongated, alternating third chutes, each of said third chutes having an outlets spaced a predetermined distance upstream of said outlet of said second chutes, and an inlet adapted to receive a hot gas stream from the core of the engine.

15. The engine of claim 14, wherein said third chutes are disposed in axial flow communication with respective ones of said second chutes such that said hot gas stream passing through said third chutes mixes with said stream of fan air passing through said second chutes to thereby increase the temperature of said fan air prior to teaching the outlet of said second chutes.

16. The gas turbine engine of claim 13, including a plurality of first spray bars extending radially inwardly from said engine outer casing and terminating within a respective one of each of said third chutes.

17. The gas turbine engine of claim 16, including a plurality of second spray bars extending radially inwardly from said outer casing and being spaced downstream from said first spray bars proximate the outlets of said third chutes.

18. The mixer arrangement of claim 13, including flame holder means, disposed substantially adjacent said terminus of said mixer, for stabilizing the combustion of fuel and air in an afterburner section of the engine during thrust augmentation.

* * * * *